United States Patent [19]
Kameyama

[11] Patent Number: 5,928,120
[45] Date of Patent: Jul. 27, 1999

[54] METHOD AND APPARATUS FOR EXCHANGING TOOLS IN A MACHINE TOOL WITH LOCKING GRIPPERS

[75] Inventor: Fumio Kameyama, Nagoya, Japan

[73] Assignee: Brother Kogyo Kabushiki Kaisha, Nagoya, Japan

[21] Appl. No.: 08/903,422

[22] Filed: Jul. 30, 1997

[30] Foreign Application Priority Data

Nov. 19, 1996 [JP] Japan ................................. 8-308345

[51] Int. Cl.$^6$ ................................................. B23Q 3/157
[52] U.S. Cl. ................................. 483/38; 483/1; 483/36; 483/44
[58] Field of Search ........................ 294/87.22, 87.24, 294/110.1, 110.2, 106, 115, 116; 414/736, 739; 483/1, 36–38, 41, 44, 902; 901/39

[56] References Cited

U.S. PATENT DOCUMENTS

| | | | |
|---|---|---|---|
| 3,760,958 | 9/1973 | Lohneis | 214/1 |
| 3,840,981 | 10/1974 | Kielma et al. | 483/36 |
| 3,964,616 | 6/1976 | Piotrowski | 483/34 |
| 4,072,236 | 2/1978 | Nomura et al. | 483/44 |
| 4,300,278 | 11/1981 | Nomura et al. | 483/44 |
| 4,817,267 | 4/1989 | Hitomi | 483/36 |
| 4,833,772 | 5/1989 | Kobayashi et al. | |
| 4,845,834 | 7/1989 | Watson | 483/44 |
| 4,879,802 | 11/1989 | Winkler et al. | 483/36 |
| 5,081,762 | 1/1992 | Kin | |
| 5,142,766 | 9/1992 | Wehrmeister | 483/15 |

FOREIGN PATENT DOCUMENTS

| | | | |
|---|---|---|---|
| 54-35486 | 3/1979 | Japan | 483/44 |
| 56-3160 | 1/1981 | Japan | 483/902 |
| 57-178632 | 11/1982 | Japan | 483/44 |
| 63-102851 | 5/1988 | Japan | 483/44 |
| A-63-123646 | 5/1988 | Japan . | |
| A-3-92238 | 4/1991 | Japan . | |
| 556929 | 5/1977 | U.S.S.R. | 483/902 |

*Primary Examiner*—Andrea L. Pitts
*Assistant Examiner*—Christopher Kirkman
*Attorney, Agent, or Firm*—Oliff & Berridge, PLC

[57] ABSTRACT

When pairs of fingers grasp tools and a tool exchange arm starts lowering, upper ends of lock pins which have been held by a spindle head are released, the lock pins are pushed up by urging forces of springs, and tapered portions of the lock pins push out steel balls to external sides. Thus, cylindrical portions of the pairs of fingers are prevented from opening, and opening and closing of the pair of fingers are locked.

19 Claims, 8 Drawing Sheets

METHOD AND APPARATUS FOR EXCHANGING TOOLS IN A MACHINE TOOL WITH LOCKING GRIPPERS

BACKGROUND OF THE INVENTION

1. Field of the Invention

The present invention relates to a tool gripper of a machine tool, particularly to a method and a tool gripper of a machine tool for exchanging tools set to a spindle and a tool magazine of the machine tool.

2. Description of Related Art

There has been conventionally known a machine tool capable of exchanging tools between a spindle and a tool magazine. A tool gripper is installed to such a machine tool, tools respectively set to a spindle and a tool magazine are grasped by pairs of fingers installed to a main body of the tool gripper, and tools are exchanged by changing positions thereof by pivoting a tool exchange arm.

There has been known a structurally simple finger opening and closing mechanism of this kind disclosed in JP-A-3-92238 and U.S. Pat. No. 4,833,772. A center shaft installed with finger driving cams is separately installed at the inside of a hollow pivoting shaft for pivoting a tool exchange arm that accurately regulates motion of the fingers by which pairs of fingers which are urged by springs are opened or closed.

However, such a tool gripper grasps tools only by spring force and therefore, centrifugal force exerted on a tool exceeds the grasping force of the tool exerted by a spring mechanism depending on a pivoting speed of the tool exchange arm. Thus, the tool may be detached from the pair of fingers installed at the inside of the tool exchange arm.

Further, according to such a tool gripper, a pivoting shaft in a hollow section must be fabricated and therefore, the fabrication cost is increased. Furthermore, in respect of the center shaft for opening and closing claw portions at front ends of a pair of fingers, the center shaft is obliged to have a slender shape since it is incorporated at the inside of the pivoting shaft. Accordingly, strength of the center shaft against torsion is small and it is conceivable that even if a pivoting angle of the center shaft is set, an opening and closing angle of the claw portions at the front ends of the pair of fingers is not provided with a predetermined value and therefore, it is necessary to pivot the center shaft excessively in consideration of the torsion. Also, the life of the center shaft is shortened by the torsion.

SUMMARY OF THE INVENTION

An object of the present invention is to provide a tool gripper resolving the above-described problems where tools are not detached by centrifugal force caused by pivoting a tool exchange arm and where strength in respect of torsion is larger than that in a conventional case.

In order to resolve the above-described problems, according to the present invention, there is provided a tool gripper for exchanging tools between a spindle and a tool magazine of a machine tool, the tool gripper including a tool exchange arm having a pivoting shaft on a first axial line parallel to the spindle, pairs of fingers installed openably and closably to the tool exchange arm for holding the tools, and a lock mechanism for locking of the pairs of fingers in open and closed positions during pivoting of the tool exchange arm.

Opening and closing of the pairs of fingers are prevented when pivoting the tool exchange arm and therefore, detachment of tools can be prevented when the pivoting speed of the tool exchange arm is increased.

Further, according to another aspect of the present invention, a lock mechanism for locking opening and closing of the pairs of fingers at least in pivoting the tool exchange arm may be provided to a tool gripper of a tool exchanger in a machine tool where a plurality of sets of the pairs of fingers, which are opened and closed by pivoting about second axial lines parallel to the first axial line, are mounted to a tool exchange arm main body having a pivoting shaft on the first axial line, urging structure for urging claw portions at front ends of the pairs of fingers in one of a closing and an opening direction are mounted to the respective pairs of fingers, a finger driving cam that reciprocates along a constant angle is installed around the first axial line, driven portions for being pivoted in one of a direction of opening and a direction of closing the fingers against urging forces of the urging structure are installed, a drive force from a tool exchanger drive shaft is transmitted to the tool exchange arm and the pairs of fingers, and tools set to the spindle and the tool magazine of the machine tool are exchanged by utilizing grasping operation of the pairs of fingers and upward, downward and pivoting motion of the tool exchange arm main body. Thereby, detachment of the tools when the pivoting speed of the tool exchange arm is increased can be prevented.

The lock mechanism may be featured in that the opening and closing of the pairs of fingers are locked or released by moving lock pins which are urged by springs upwardly and downwardly in accordance with the upward and downward motion of the tool exchange arm.

The lock mechanism may be featured in that the lock mechanism is installed at the inside of a support point shaft of the finger.

No space for generating power for the lock mechanism needs to be provided separately such that the space can effectively be utilized.

Further, according to another aspect of the present invention, there is provided a tool gripper, wherein a finger driving cam is arranged to a finger driving cam shaft for reciprocating on the first axial line by a constant angle, and wherein a lower end of a hollow outer shaft arranged on an external side of the pivoting shaft of the tool exchange arm main body is fitted to an upper end of the cam shaft by which a drive force from a tool exchanger drive shaft is transmitted to the cam shaft via the outer shaft.

According to another aspect of the present invention, there is provided a tool gripper, wherein drive force transmitting portions of the tool exchanger drive shaft and the outer shaft are arranged at a vicinity of the tool exchange arm main body by which a length of the outer shaft in an axial direction is shortened.

According to the above-described construction, the diameter of the outer shaft for opening and closing the claw portions at the front ends of the pair of fingers is increased, and a length thereof in the axial direction is shortened. Accordingly, the strength against torsion is increased and an excessive pivoting is not needed by which tool exchange time can be shortened.

BRIEF DESCRIPTION OF THE DRAWINGS

Preferred embodiments of the present invention will be described in detail with reference to the following figures, wherein.

DETAILED DESCRIPTION OF PREFERRED EMBODIMENT

An explanation will be given of preferred embodiments according to the present invention in reference to the drawings. Incidentally, the embodiments of the present invention are not limited to the following embodiments, but the present invention can naturally be implemented in various embodiments so far as they pertain to the technical scope of the present invention.

Firstly, an explanation will be given of an outline of the total of a machining center where a tool exchanger TC according to the embodiment is mounted mainly in reference to FIG. 1.

Figure 1:
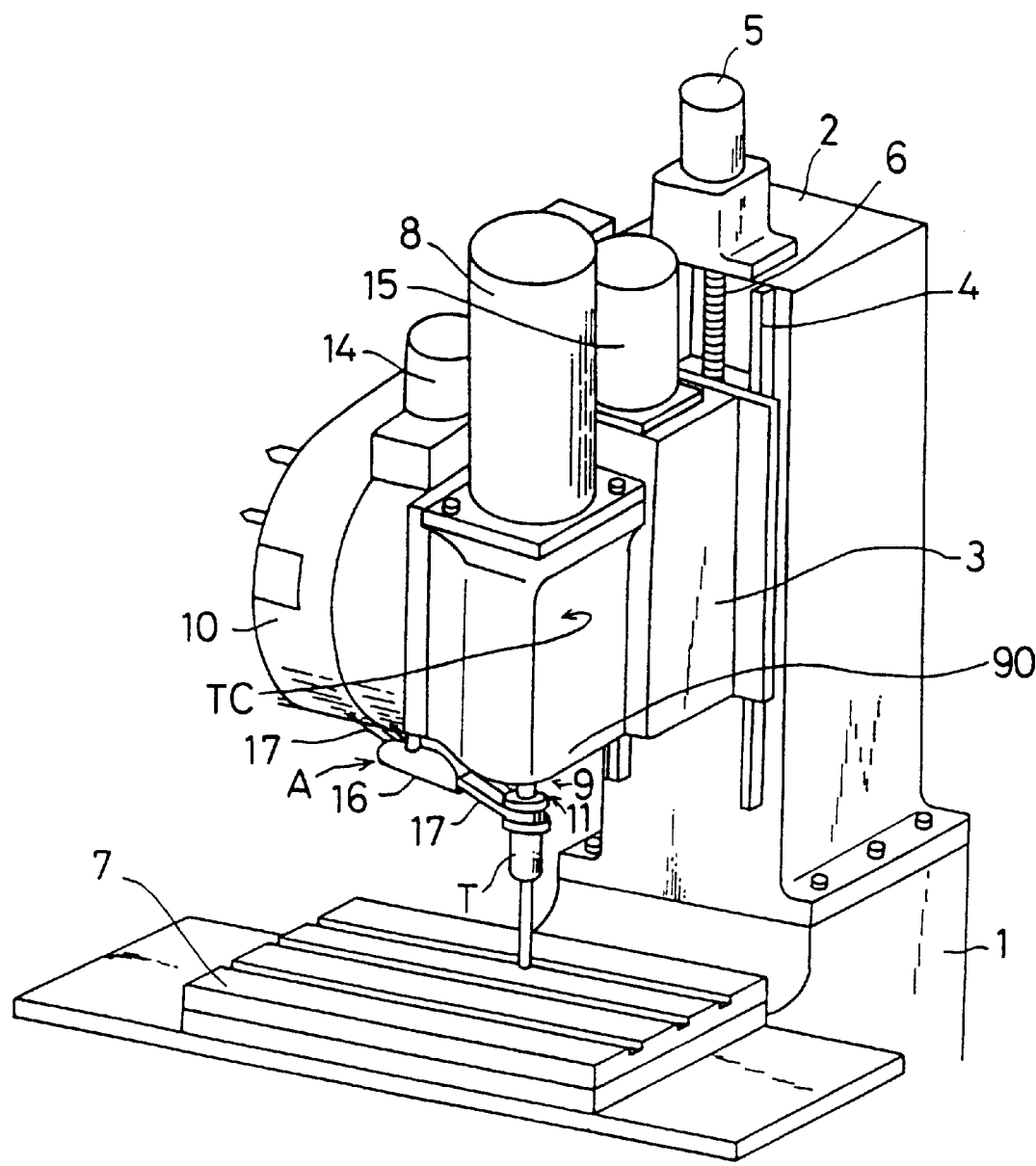
FIG. 1 is a perspective view of a tool exchanger according to the present invention.

As shown in FIG. 1, according to the machining center, a head stock 3 is supported by a column 2 that is erected on and fixed to a base 1. The head stock 3 is guided by a linear guide 4 and is moved in the up and down direction by a Z-axis feed motor 5 and a feed screw 6. A table 7 installed to the base 1 is movable in directions on a horizontal plane. A spindle motor 8, a spindle 9 and a rotary type tool magazine 10 are mounted to the head stock 3. Incidentally, in respect of the spindle 9 and the tool magazine 10, a spindle and a tool magazine similar to those disclosed in U.S. Pat. No. 4,833,772, herein incorporated by reference, are used.

The spindle 9 is provided with a tool attaching portion 11 capable of holding a tool T attachably and detachably and a tool release pin (not shown) for detaching the tool T by connecting the pin to the tool attaching portion 11 via a drawbar (not shown).

According to the tool magazine 10, a plurality of hold ports for detachably holding the tool T are normally poised in a horizontal attitude. The hold ports are installed at a surrounding portion of a rotating disk. Only a hold port disposed at the lowest position is poised in a vertical attitude by being rotated downwardly by 90 degrees. This hold port is brought into a state where the tool is exchangeable by a tool exchanger TC according to the present invention. Selection of the tool T (arrangement to the lowest position) is executed by rotation of a magazine motor 14.

The tool exchanger TC of this embodiment for exchanging the tools T between the tool magazine 10 and the spindle 9 is integrated to the head stock 3. The tool exchanger TC is constituted by a tool exchange drive motor 15, a tool exchange arm A and the like.

The tool exchange arm A in the embodiment is mainly constituted by a tool exchange arm main body 16 (hereinafter, simply referred to as "arm main body") and two sets of pairs of fingers 17, capable of opening and closing, that are arranged to extend from the arm main body 16 toward outer sides at positions symmetrical with respect to a center axis of the arm main body. The tools T set to the spindle 9 and the tool magazine 10 are exchanged by utilizing grasping operation of the pairs of fingers 17 and pivoting, upward and downward motion of the arm main body 16.

Figure 2:
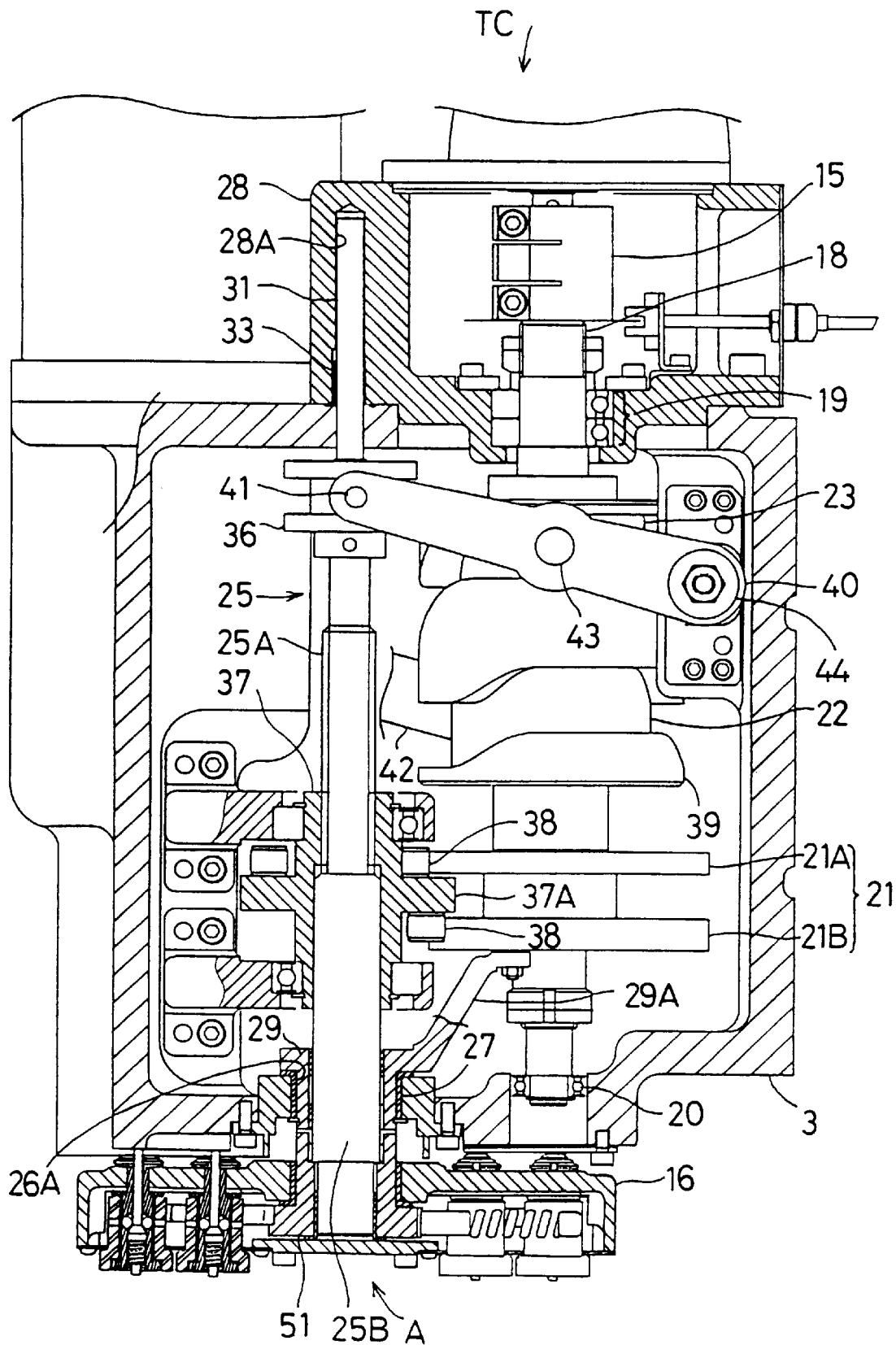
FIG. 2 is a vertical sectional view of the tool exchanger according to the present invention.
Figure 3:
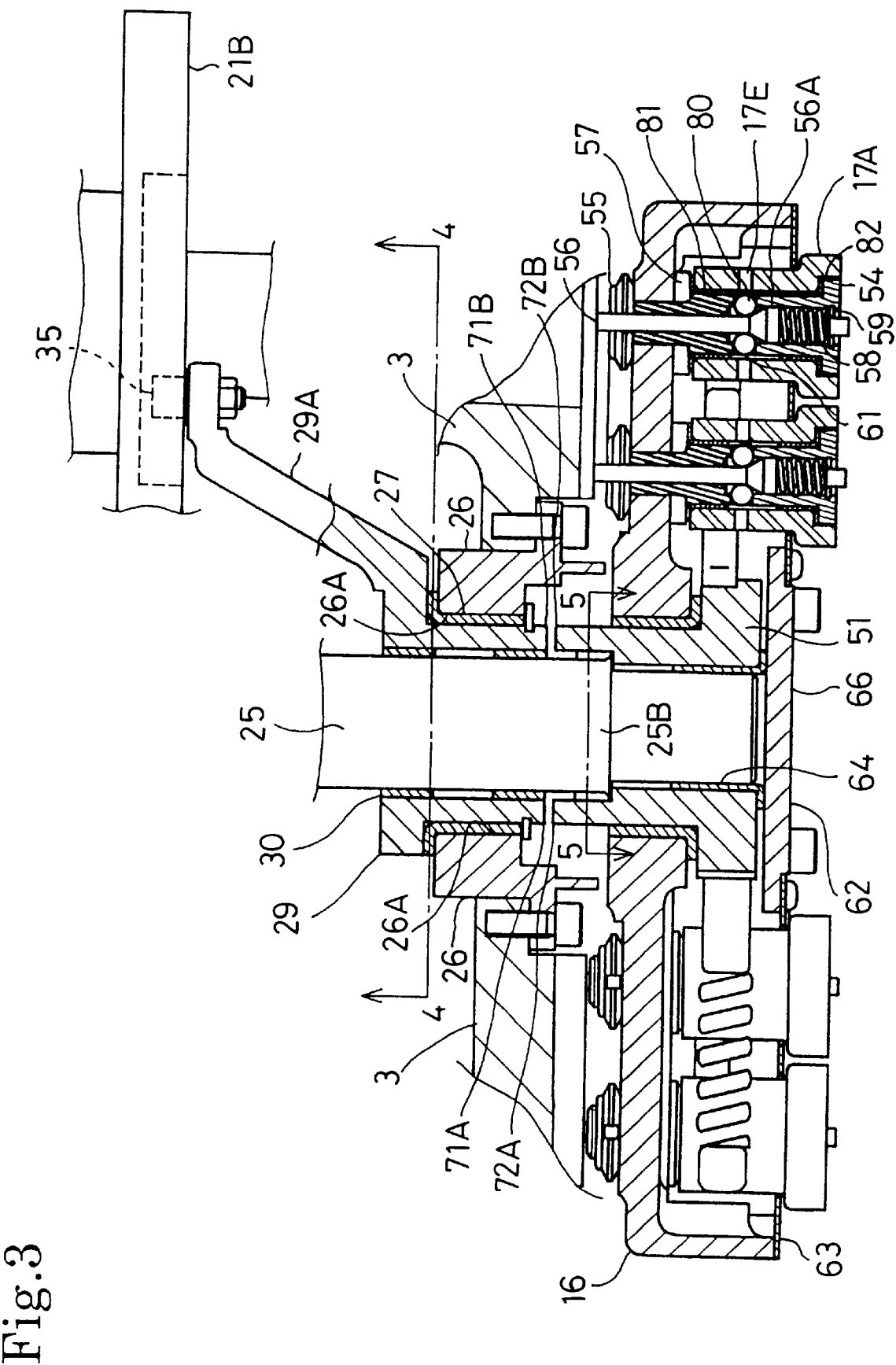
FIG. 3 is an enlarged sectional view of the tool gripper of FIG. 2.

FIG. 2 shows the total construction of the tool exchanger TC causing the motion of the tool exchange arm A, and FIG. 3 shows a sectional view of a tool gripper corresponding to other features of the present invention.

As shown in FIG. 2, a tool exchanger drive shaft 18 (hereinafter, referred to as "ATC drive shaft") of the tool exchanger TC is coupled to a tool exchange drive motor 15. The shaft is arranged in the vertical direction and is rotatably supported by the head stock 3 via bearings 19 and 20. Three cams 21, 22 and 23 are installed to the ATC drive shaft 18.

Meanwhile, a pivoting shaft 25 is arranged in the vertical direction at the side of the ATC drive shaft 18. A support portion 31 in a shape of a long shaft is installed at the upper portion of the pivoting shaft 25, a spline 25A is installed at a central portion thereof, and a flange portion 25B is installed at a vicinity of a lower end thereof. The arm main body 16 is fixed to the flange portion 25B.

A stepped hole 28A having an inner diameter larger than an outer diameter of the support portion 31 is installed to an upper machine frame 28 of the head stock 3. The support portion 31 is inserted into the stepped hole 28A via a bush 33 arranged at the lower stage of the stepped hole 28A and the pivoting shaft 25 is supported such that the shaft can be rotated around the axis and reciprocated in the axial direction.

Meanwhile, as shown in FIG. 3, the pivoting shaft 25 is provided with the flange portion 25B at a vicinity of the lower end. The flange portion 25B includes a portion projected from the outer peripheral face of the pivoting shaft 25 toward a direction orthogonal to the face of the paper face in FIG. 3. A portion of the pivoting shaft 25 above the flange portion 25B penetrates a bush 30 and an outer shaft 29 having a substantially cylindrical shape and a hole diameter larger than the diameter of the pivoting shaft 25. A portion of the pivoting shaft 25 below the flange portion 25B is inserted into a cylindrical finger driving cam shaft 51 via a bush 64.

A hole 26A is provided to a lower machine frame 26 of the head stock 3. The outer shaft 29 penetrates the hole 26A via a bush 27 and is supported such that it can be pivoted around the center axis independently from the pivoting shaft 25.

As shown in FIG. 2, the pivoting shaft 25 is provided with a cylindrical member 36 having a circular groove which is fixed at the upper portion with respect to the vertical direction. By moving the cylindrical member 36 upwardly and downwardly, the pivoting shaft 25 is reciprocated in the vertical direction. Further, the pivoting shaft 25 is rotated around the axis by rotation of a spline sub shaft 37 that is fitted to the spline 25A at the central portion. Incidentally, shafts of follower rollers 38, which follow movement of the cams 21, are fixed at upper and lower faces of a flange portion 37A formed at the outer periphery of the spline sub shaft 37.

In FIG. 3, a pivoting arm 29A is installed to the upper end portion of the outer shaft 29, a pivoter 35 is fixed to the upper end of the pivoting arm 29A, and the pivoter is driven by a cam 21B.

When the tool exchange arm A is at an upper dead point, the outer shaft 29 is fitted to the finger driving cam shaft 51 at the lower portion in the axial direction.

That is, recesses 71A and 71B, the lower sides of which are opened, are provided at two locations of the lower end portion of the cylindrical outer shaft 29. The recesses 71A and 71B are remote from each other by 180 degrees. Meanwhile, projections 72A and 72B are provided at two locations of the upper end portion of the finger driving cam shaft 51 which are opposed to the recesses 71A and 71B and the respective projections 72A and 72B are fitted to the respective recesses 71A and 71B.

Figure 5:
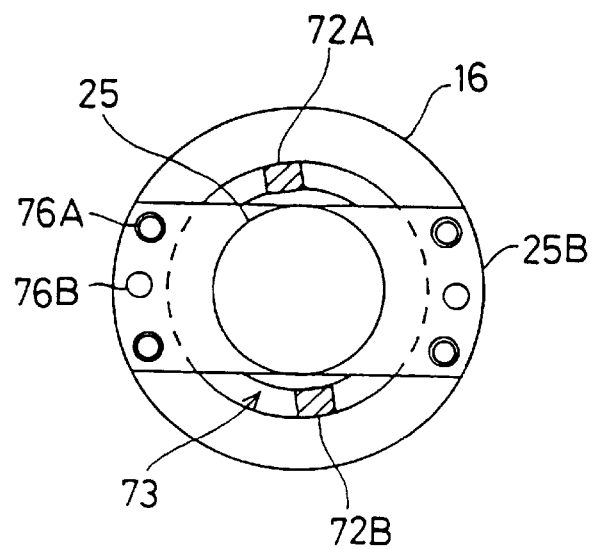
FIG. 5 is a sectional view taken from a line 5—5 of FIG. 3.

FIG. 5 is a view showing a section taken from a line 5—5 in FIG. 3. As shown in FIG. 3 and FIG. 5, the flange portion 25B, which connects the pivoting shaft 25 and the arm main body 16, is provided with a shape where opposed portions of a circular disk are cut off in parallel, and the central portion of the upper face thereof is coupled to the lower face of the pivoting shaft 25. The flange portion 25B is coupled to the arm main body 16 using pins 76A and screws 76B in a state where lower faces of two circular portions are brought into contact with the upper face of the arm main body 16. The recesses 71A and 71B are fitted to the projections 72A and 72B at positions slightly remote from the upper face of the flange portion 25B in the upward direction. As described below, the rotational motion of the pivoting shaft 25 and the arm main body 16 is conducted in a state where the rotating shaft 25 and the arm main body 16 are moved downwardly, and the fitting of the fitted portions is released. Conversely, the rotational motion of the outer shaft 29 and the finger driving cam shaft 51 is conducted in a state where the pivoting shaft 25 and the arm main body 16 are pulled up upwardly, and the outer shaft 29 is fitted to the finger driving cam shaft 51 at the fitted portions. At this moment, the fitted portions are only rotated in a space 73 at the side of the flange portion 25B by a predetermined angle. Accordingly, the pivoting motion is not hindered by the flange portion 25B.

Referring to FIG. 3, the tool exchange arm A of the embodiment is provided with a center shaft holder 62, an arm main body holder 63 and the like. The center shaft holder 62 is brought into contact with the lower side of the finger driving cam shaft 51 via the bush 64. Cylindrical portions 17A are inserted into holes of the arm main body holder 63 bonded to the arm main body 16. The center shaft holder 62 and the arm main body holder 63 incorporate drive mechanisms (springs 58 or the like) of the pairs of fingers 17 in a space surrounded by the center shaft holder 62, the arm main body holder 63 and the arm main body 16.

Two sets of pairs of through holes are installed at the upper face of the arm main body 16 symmetrically in respect of the finger driving cam shaft 51. Two sets of the pairs of fingers 17 having the same construction are supported by the arm main body 16 by bolts 54 and nuts 55 by utilizing the respective sets of the through holes. Support is provided in a state where the bolts 54 are inserted through the cylindrical portions 17A via bushes 81 and 82, and wheel rings 57 are interposed between the arm main body 16 and the upper end portions of the cylindrical portions 17A. The bolts 54 are alternatively referred to as support point shafts.

A stepped through hole is opened in the bolt 54 along the axial line in the fastening direction, and a lock pin 56 penetrates the through hole. The lock pin 56 is provided with the shape of a long shaft and a flange 56A having a tapered portion whereby the section that converges toward the upward direction is provided at a position near the center. A spring 58 is attached to the lower portion of the lock pin 56 extending to the lower portion of the stepped through hole. The upper end of the spring 58 is brought into contact with the lower face of the flange 56A of the lock pin 56, and the lower end is fixed to the bolt 54 via a spring holder 59. Thereby, the lock pin 56 is urged upwardly by the spring 58. Further, a single or a plurality of steel balls 80 are arranged at substantially the central portion of the stepped through hole of the bolt 54. The steel balls 80 are brought into contact with the tapered portion of the flange 56A of the lock pin 56.

Circular holes 61 having substantially the same diameter or magnitude as the steel balls 80 are opened at two locations of the side face of the bolt 54 where the steel balls 80 are arranged. Small circular holes 17E that are slightly smaller than the circular holes 61 are opened at the cylindrical portion 17A where the bolt is inserted at positions opposed to the circular holes 61. When an external force resisting the urging force of the spring 58 is not exerted on the lock pin 56, by elevating the flange 56A of the lock pin 56 that is urged by the spring, the tapered portion pushes out the steel balls to the external side, and the steel balls 80 engage the small circular holes 17E of the cylindrical portion 17A via the circular holes 61. By the engagement of the steel balls 80 and the small circular holes 17E at this moment, the pivoting of the cylindrical portion 17A is locked. That is, the opening and closing motion of the fingers is locked at this moment.

Incidentally, although the circular holes 61 and the small circular holes 17E are shown in the embodiment, these holes are not limited to circular ones but may naturally have various shapes.

Figure 6:
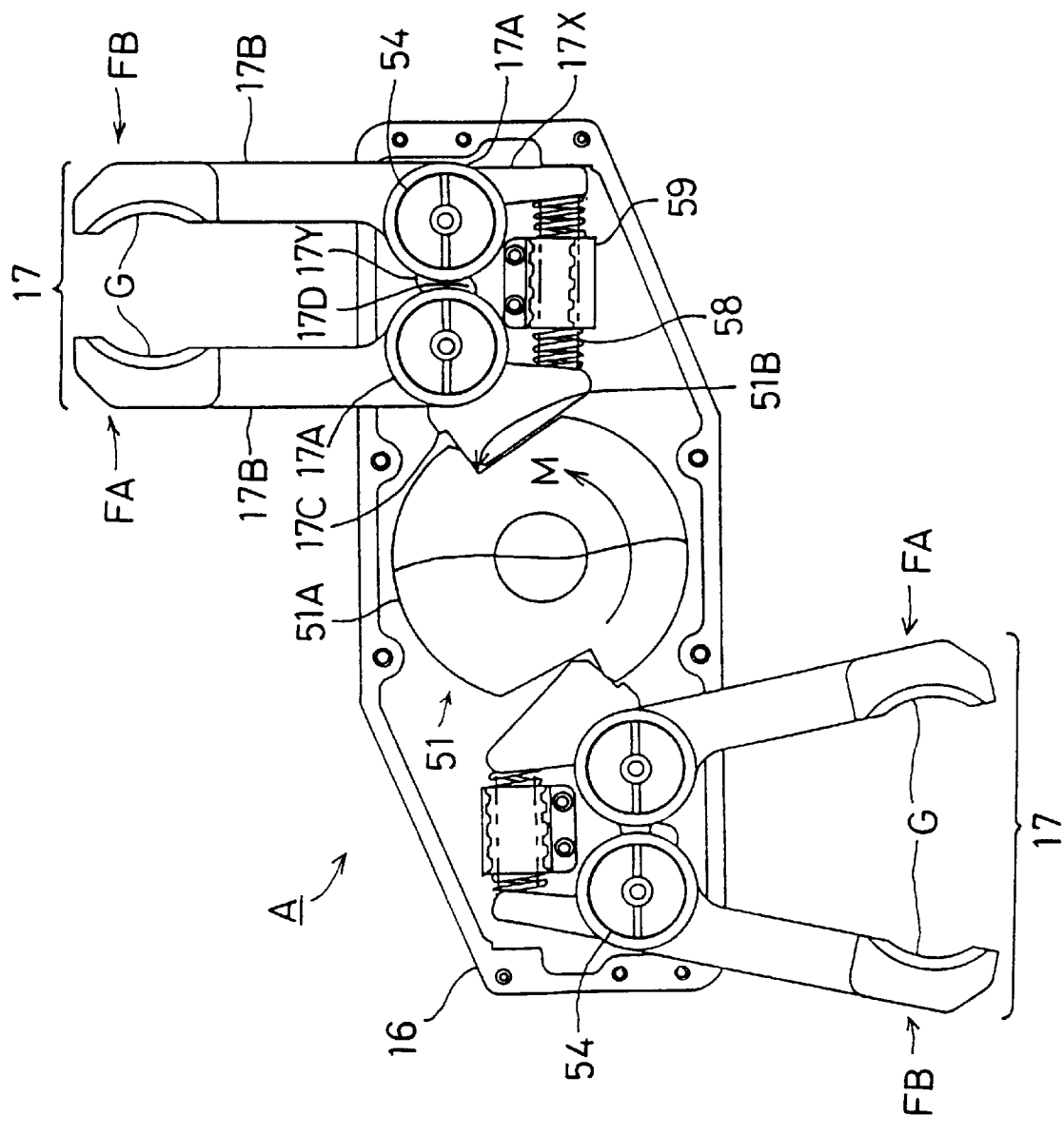
FIG. 6 is a view viewing from below a tool exchange arm according to the present invention.

FIG. 6 is a view viewing from below the tool exchange arm A according to one preferred embodiment of the invention. The arm main body 16 of the tool exchange arm A is symmetrical in respect of the finger driving cam shaft 51 which penetrates the center hole of the tool exchange arm A and is pivoted in the center hole independently from the arm main body 16.

The finger driving cam shaft 51 is integrally provided with a cam portion 51A in a shape of a flange at a vicinity of the lower end in the vertical direction. The cam portion 51A is provided with a shape where two symmetrical portions of a circle are cut off as seen from below. The two cut-off portions 51B have the same shape.

A finger FA of each set of the pair of fingers 17 on the side near to the center cam shaft 51 is integrally formed by the cylindrical portion 17A where the bolt 54 is positioned. A finger main body portion 17B extends from the cylindrical portion 17A to the external side of the arm main body 16 which is provided with a gripping jaw or a grasping claw G, and a driven portion 17C extends from the cylindrical portion 17A in a direction substantially opposed to the finger main body portion 17B. A projecting portion 17D projects substantially vertically to the finger main body portion 17B and the driven portion 17C. Another finger FB is substantially symmetrical with the finger FA. However, the difference therebetween resides in that a corresponding driven portion 17X is smaller than the corresponding driven portion 17C, and the position of a projecting portion 17Y corresponding to the projecting portion 17D (hereinafter, referred to as engaging portion) is slightly different from the position of the projecting portion 17D.

Each of the fingers FA and FB is brought into a pivotable state centering on an axial line (second axial line) parallel to an axial line (first axial line) of the finger driving cam shaft 51 in the tool exchange arm A by supporting it by the bolt 54 and the nut 55. The projecting portion 17D and the engaging portion 17Y are opposed to each other. Further, the driven portion 17C of the finger FA is arranged at the inside of the cut-off portion 51B.

A spring 58 is set by a spring holder 59 to the arm main body 16 such that it is disposed between the driven portion 17C and the corresponding driven portion 17X of each of the pairs of fingers 17.

The spring 58 urges the driven portion 17C and the corresponding driven portion 17X in an opening direction (external direction). Therefore, both of the finger main body portions 17B of the pair of fingers 17 are urged in a closing direction with the fixed cylindrical portions 17A as fulcrums. However, with respect to the finger FA, the driven portion 17C is brought into contact with the cam portion 51A and is brought into a state where it is not closed by a certain amount or more. Meanwhile, also with respect to the finger FB, the engaging portion 17Y meshes with the projecting portion 17D of the finger FA and accordingly, it is prevented from closing by a certain degree or more.

When the driven portion 17C is pressed against the urging force of the spring 58, the finger FA is pivoted in the opening direction with the cylindrical portion as a fulcrum. Also, the finger FB is pivoted in the opening direction since the engaging portion 17Y is pressed by the projecting portion 17D. The opening of the pair of fingers 17 is carried out by exerting a pressing force from the cam portion 51A to the driven portion 17C by pivoting the cam portion 51A around the central axis by a predetermined angle.

The total construction of the tool exchanger has been clarified by the above description and accordingly, an explanation will be given of the operation of the tool exchanger TC in this embodiment.

In exchanging the tools, the pair of fingers 17 respectively grasp the used tool T mounted to the spindle 9 and the new tool T set to the magazine 10 (refer to FIG. 1). When the grasping operation is completed, the tool exchange arm A is lowered and pivoted by 180 degrees by which the positions of the tools are exchanged. Thereafter, the tool exchange arm A is elevated, the new tool T is mounted to the spindle 9 and thereafter, the grasping of the tool T is released and the used tool T is stored in the magazine 10.

An explanation will be given of the operation of the respective steps in reference to FIG. 2 and FIG. 3 as follows.

As described above, the tool exchange arm A is reciprocated in the axial direction of the pivoting shaft 25. This operation is for drawing the tool T from the spindle 9 or the tool magazine 10 or clamping it. The cylindrical groove cam 23 around the ATC drive shaft 18 which is formed at the upper portion of the peripheral face of the cylindrical member 39 is related to this motion. A pivoting lever 40 pivoting with a support point 44 as a fulcrum is engaged with the cylindrical groove cam 23 via an engager 43 installed at the vicinity of the central portion, and a contacter 41 installed at the front end of the pivoting lever 40 is engaged with a circular groove of the cylindrical member 36 fixed to the pivoting shaft 25. Therefore, when the ATC drive shaft 18 is rotated by one revolution, the pivoting lever 40 is pivoted and the pivoting shaft 25 and the tool exchange arm A fixed thereto are reciprocated by one reciprocation in the axial direction.

Incidentally, as shown in FIG. 2, the tool exchanger TC of the embodiment is provided with a mechanism for drawing the used tool T from the spindle 9. That is, the cylindrical groove cam 22 is formed at the upper portion of the peripheral face of the cylindrical member 39 at the external side of the ATC drive shaft 18. When the tool T is drawn from the spindle 9, the tool can be detached therefrom by pushing down a tool release pin (not shown) connected to a drawbar (not shown) of a tool attaching and detaching device of the spindle 9 by a pivoting member 42 which pivots by following the cylindrical groove cam 22.

The tool exchange arm A is pivoted in the horizontal direction. This operation is for exchanging the tools T at the spindle 9 and the tool magazine 10. The parallel cams 21 installed at the lowest portion of the ATC drive shaft 18 are related to this operation. The operation thereby is similar to that in a corresponding portion of a device disclosed in JP-A-63-123646 and U.S. Pat. No. 4,833,772. Accordingly, a simple explanation will be given thereof. The parallel cams 21 constitute a composite cam comprising two sheets of plate cams 21A and 21B which are brought into contact with the follower rollers 38 installed to the spline sub shaft 37. Based on this construction, during one rotation of the ATC drive shaft 18, the spline sub shaft 37, the pivoting shaft 25 and the tool exchange arm A are rotated by 180 degrees.

Further, the pair of fingers 17 of the tool exchange arm A are opened and closed. The plate cam 21B, which is one of the parallel cams 21 installed at the lowest position of the ATC drive shaft 18, is related to this motion.

Figure 4:
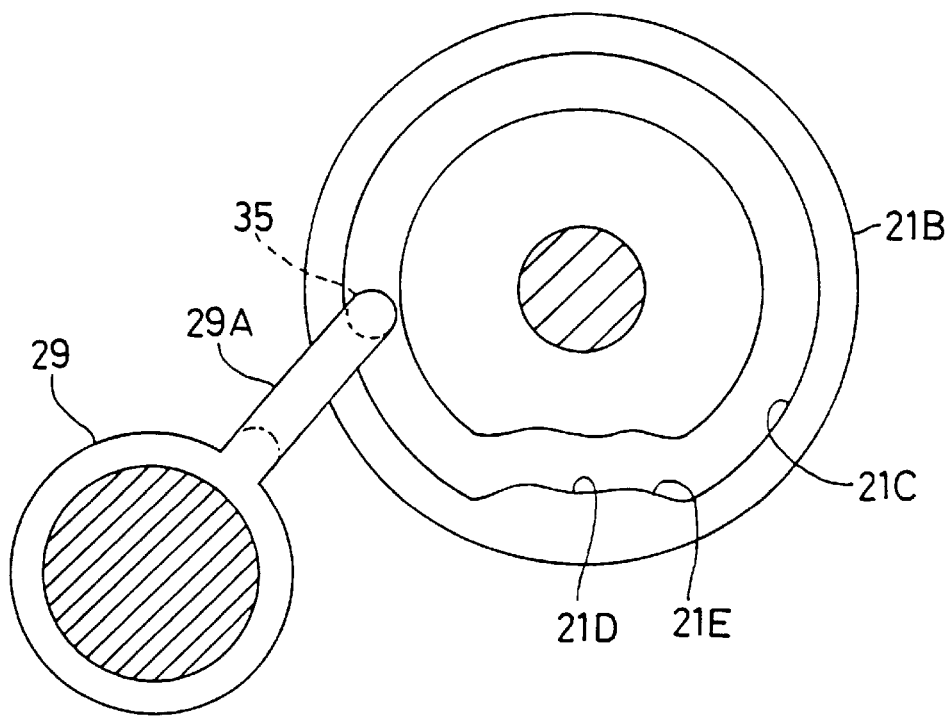
FIG. 4 is a sectional view taken from a line 4—4 of FIG. 3.

FIG. 4 is a sectional view taken from a line 4—4 of FIG. 3. As illustrated, the lower face of the plate cam 21B is provided with a groove shape and the groove shape is provided with a large diameter portion 21C and a small diameter portion 21D in circular arc shapes centering on the cam shaft and connecting portions 21E for connecting sections 21C and 21D. The pair of fingers 17 are brought into a closed state, an opened state or an opening and closing state depending on where the pivoter 35 contacts either of the large diameter portions 21C, the small diameter portion 21D and the connecting portions 21E of the rotating plate cam 21B.

That is, when the ATC drive shaft 18 is rotated to reach a predetermined angle, during a time period where the pivoter 35 is detached from the large diameter portion 21C of the plate cam 21B and the pivoter 35 passes through the connecting portion 21E from the large diameter portion 21C to the small diameter portion 21D, the pivoting arm 29A connected to the pivoter 35 is pivoted in one direction with the center axis of the outer shaft 29 as a fulcrum. Further, during a time period where the pivoter 35 is detached from the small diameter portion and passes through the connecting portion 21E from the small diameter portion 21D to the large diameter portion 21C, the pivoting arm 29A connected to the pivoter 35 is pivoted in a direction reverse to the above-described direction. In this way, the outer shaft 29 is pivoted in correspondence with the pivoting motion of the pivoting arm 29A driven by the pivoter 35 by a certain angle.

By pivoting the outer shaft 29, the finger pivoting cam shaft 51 of the tool exchange arm A fitted thereto starts pivoting, and the cam portion 51A at the external side of the finger driving cam shaft 51 starts rotating in a direction of an arrow mark M in FIG. 6, that is, in a direction where the finger FA is not pressed. Therefore, the finger FA starts closing by the urging force of the spring 58.

Figure 7A:
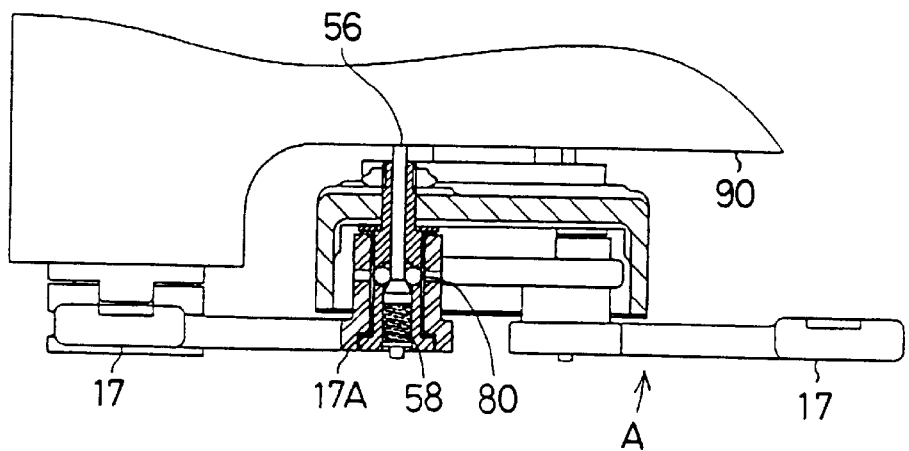
FIGS. 7A and 7B are views showing motion of a tool exchanger according to the present invention.
Figure 7B:
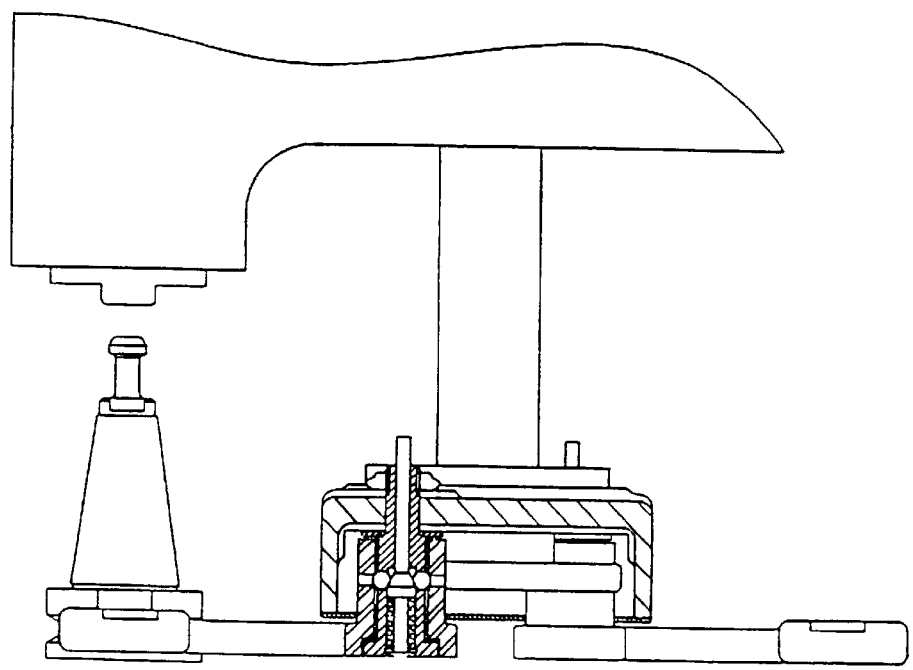

FIGS. 7A and 7B show the operation of the tool gripper of the present invention. In a state of FIG. 7A, when the pairs of fingers 17 grasp the tools and the tool exchange arm A starts lowering, the upper ends of the lock pins 56 which have been held by a spindle head 90, are opened whereby the lock pins 56 are pushed upwardly by the urging force of the springs 58. At the same time, the tapered portions of the lock pins 56 push the steel balls 80 to the external sides by which the cylindrical portions 17A of the pairs of fingers 17 are prevented from pivoting whereby the opening and closing of the pairs of fingers 17 are locked. FIG. 7B shows a state where the pairs of fingers 17 are locked and the tool is taken out. Even if the pivoting operation is conducted under this state, the pairs of fingers 17 are not opened by a centrifugal force since they are locked.

Figure 8A:
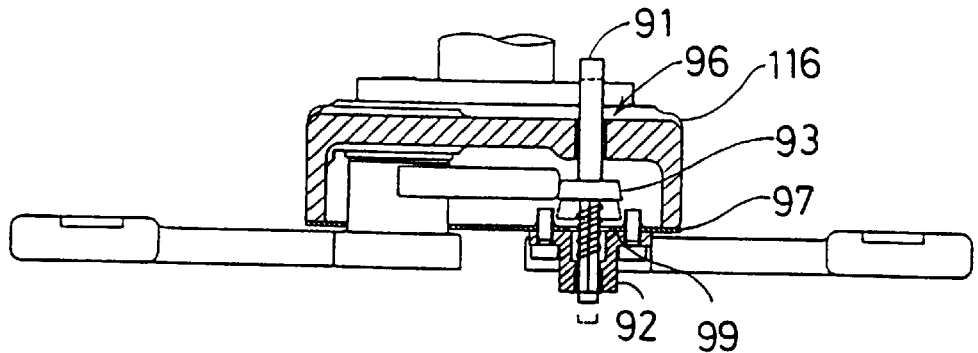
FIGS. 8A and 8B are views viewing from side and from below a tool exchange arm according to a modified example of the present invention.
Figure 8B:
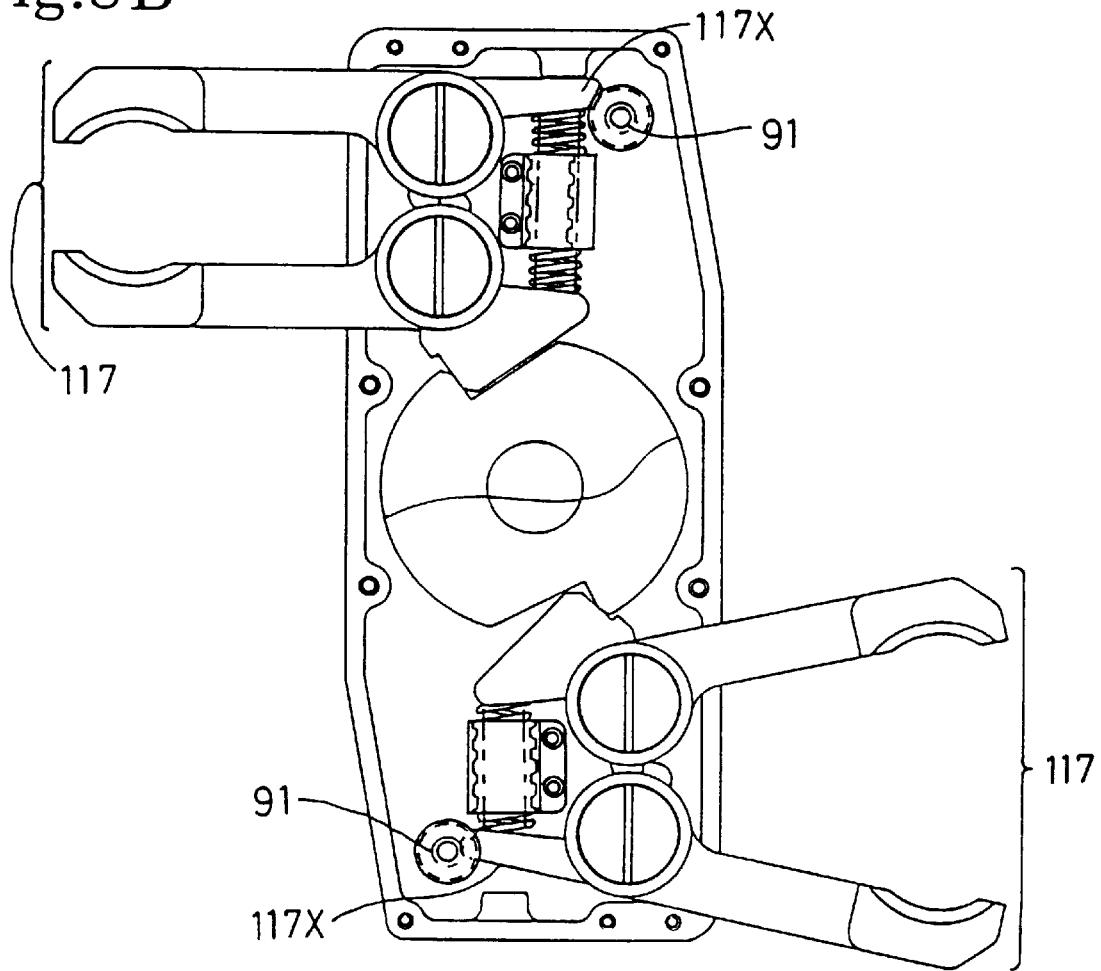

FIGS. 8A and 8B show a modified example of a tool gripper according to the present invention. As shown in FIG. 8B, according to the modified example, lock pins 91 are installed at the external sides (sides opposed to tool grasping portions) of the pairs of fingers 117.

As shown in FIG. 8A, through holes 96 are installed at corner portions of the tool exchange arm main body A, the lock pins 91 penetrate the through holes 96, and holes of an arm main body holder 97 installed at positions opposed to the through holes 96 and cylinders 92 are screwed to the arm main body holder 97 below the lock pins 91.

The upper portion of the lock pin 91 is supported by an arm main body 116 via a bush, and a lower portion thereof is supported by the cylinder 92 via a bush such that the lock pin 91 can be reciprocated in the axial direction.

A flange 93 having a tapered portion where the section converges toward the upward direction is installed at the central portion of the lock pin 91. The lock pin 91 is arranged at the upper stage of the inside of the cylinder 92 and is urged upwardly by a spring 99 mounted on the lower face of the flange 93.

Figure 9A:
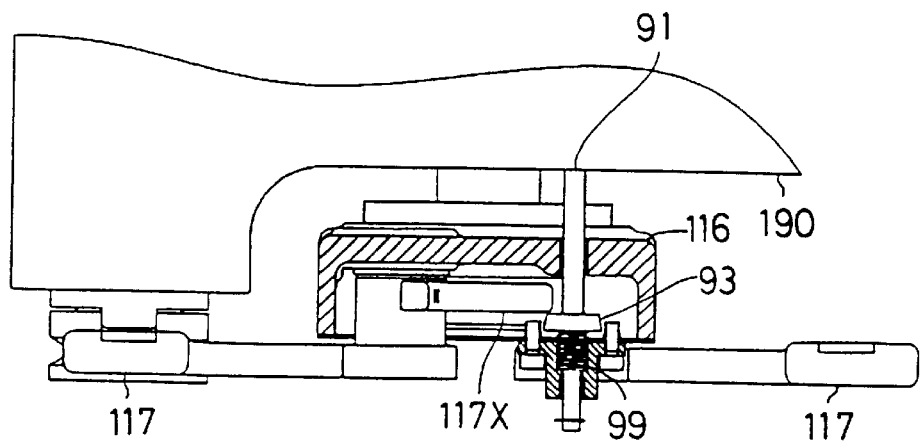
FIGS. 9A and 9B are views showing motion of a tool exchanger according to the modified example of the present invention.
Figure 9B:
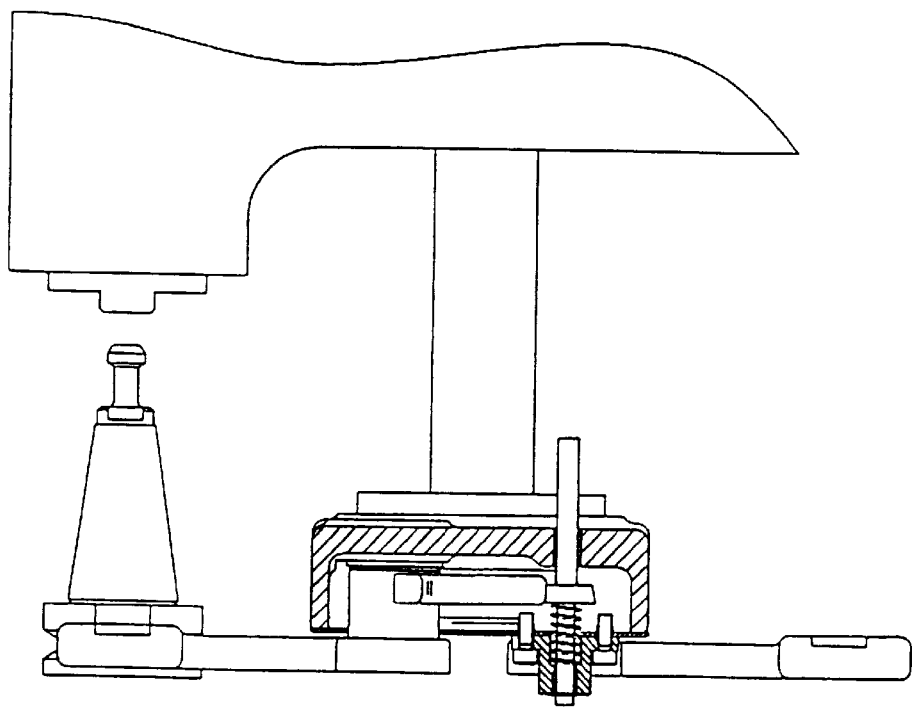

FIGS. 9A and 9B show the operation of the tool gripper according to the modified example. In a state of FIG. 9A, when pairs of fingers 117 grasp the tools and the tool exchange arm A starts lowering, the upper ends of the lock pins 91 which have been held by a spindle head 190 are released, and the lock pins 91 are pushed up in the upward direction relative to the arm main body 116 by the urging force of the springs 99. The tapered portion of the lock pin 91 which has been pushed up is engaged with a corresponding driven portion 117X of one of the pair of fingers 117 by which the motion of the pair of fingers 117 in the opening direction is locked.

FIG. 9B shows a state where the pairs of fingers 117 are locked and the tool is taken out. Under this state, even if the pivoting operation is conducted, the pairs of fingers 117 are prevented from opening by a centrifugal force since they are locked.

Although an explanation has been given of the embodiments of the present invention as described above, the present invention is not limited to embodiments at all but there may be provided a construction where springs are installed between the respective pairs of fingers for urging in the direction of opening the claw portions at front ends thereof, and a finger driving cam is operated on a driven portion by which the respective pairs of fingers are moved in the closing direction. Further, the lock mechanism of the tool gripper of the present invention may be mounted on the tool gripper disclosed in JP-A-3-92238. Although a motor is used as a driving source according to the embodiment, a rotary cylinder, a rack and pinion mechanism or the like may be used. Although according to the embodiments, the outer shaft is operated by the cam mechanism, it may be operated by other drive source, for example, an air cylinder, a motor that is not directly connected to the ATC drive axis and is installed separately therefrom, or the like.

What is claimed is:

1. A tool gripper for exchanging tools between a spindle and a tool magazine of a machine tool, said tool gripper comprising:

a tool exchange arm having a pivoting shaft on a first axial line in parallel with the spindle;

at least one pair of fingers provided on the tool exchange arm that releasably holds the tools; and a lock mechanism including at least one lock pin that controls movement of the pair of fingers, said at least one lock pin being spring biased and operable in a first state in which opening and closing of the at least one pair of fingers is allowed and a second state in which opening and closing of the at least one pair of fingers is prevented as the tool exchange arm is rotated.

2. The tool gripper according to claim 1, further comprising
   a spring that biases each said at least one lock pin.

3. The tool gripper according to claim 2, further comprising a tapered member provided on each said at least one lock pin, each said tapered member preventing the at least one pair of fingers from opening and closing when the at least one lock pin is elevated.

4. The tool gripper according to claim 3, further comprising a lock member provided to the lock mechanism, the lock member being extractable and retractable in a direction perpendicular to a direction of moving the at least one lock pin, the tapered member pushing out the lock member when the at least one lock pin is elevated.

5. The tool gripper according to claim 3, wherein, when the at least one lock pin is elevated, the tapered member is brought into contact with a portion of the at least one pair of fingers by which the pair of fingers is prevented from opening and closing.

6. The tool gripper according to claim 3, further comprising a spindle head provided on the machine tool that holds each spindle, the spindle head pushing an upper portion of the at least one lock pin when the tool exchange arm is elevated, and an upper end of each said at least one lock pin that has been pushed by the spindle head is released and the at least one lock pin is pushed up by an urging force of each spring when the tool exchange arm is lowered, each tapered portion of the at least one lock pin pushing out steel balls to external sides after the at least one lock pin is pushed up by the urging force, thereby preventing the at least one pair of fingers from opening and closing such that each said at least one pair of fingers is not operated to open.

7. The tool gripper according to claim 1, wherein the tool exchange arm includes a support point shaft that axially supports each finger of said at least one pair of fingers, and the lock mechanism is positioned at an inside of each support point shaft.

8. The tool gripper according to claim 1, wherein the at least one pair of fingers comprises a plurality of pairs of fingers provided on the tool exchange arm.

9. The tool gripper according to claim 8, wherein the plurality of pairs of fingers are opened and closed by rotating about second axial lines parallel to the first axial line, each of the pairs of fingers being mounted to a main body of the tool exchange arm.

10. The tool gripper according to claim 1, further comprising a biasing member mounted to each said at least one pair of fingers that biases tool gripping jaws at front ends of each said at least one pair of fingers in one of a closing direction and an opening direction.

11. The tool gripper according to claim 10, further comprising:

a reciprocable finger driving cam provided around the first axial line; and a driven portion provided to each said at least one pair of fingers that pivots the at least one pair of fingers in one of the opening direction and the closing direction against a biasing force of each biasing member by receiving an operation of the finger driving cam.

12. The tool gripper according to claim 11:

wherein the finger driving cam is associated with a finger driving cam shaft for reciprocating on the first axial line by a predetermined angle; and wherein a lower end of an outer shaft arranged on an external side of the pivoting shaft of the tool exchange arm main body is fitted to an upper end of the finger driving cam shaft by which a drive force from a tool exchanger drive shaft is transmitted to the finger driving cam shaft via the outer shaft.

13. The tool gripper according to claim 12, wherein drive force transmitting portions of the tool exchanger drive shaft and the outer shaft are arranged adjacent the tool exchange arm main body.

14. The tool gripper according to claim 1, wherein the at least one lock pin is engageable with a spindle head when the shaft is in a first position, and the lock pin becomes disengaged from the spindle head when the shaft is in a second position different from the first position.

15. A tool gripper for exchanging tools between a tool spindle and a tool magazine, comprising:

a tool exchange arm mounted on a shaft for at least pivotable movement during a tool exchange operation;

tool clamping fingers mounted on the tool exchange arm that releasably clamp the tools; and a control device that prevents movement of the tool clamping fingers during movement of the tool exchange arm, wherein said shaft is reciprocable between first and second positions along an axis of the shaft, and said control device includes a locking mechanism that prevents movement of the tool clamping fingers when the shaft is in the second position during movement of the tool exchange arm, and wherein the locking mechanism includes lock pins that engage a spindle head when the shaft is in the first position, and the lock pins become disengaged from the spindle head when the shaft is in the second position.

16. The tool gripper according to claim 15, further comprising a biasing member that biases the tool clamping fingers into closed positions, and said control device prevents movement from said closed positions during movement of the tool exchange or in exchange-operation.

17. The tool gripper according to claim 15, wherein the lock pins are parallel to and coincidental with fulcrum pivot points about which at least portions of the total clamping fingers pivot.

18. The tool gripper according to claim 15, wherein the lock pins are parallel to and offset from fulcrums about which portions of the clamping fingers pivot.

19. A method for exchanging tools between a tool spindle and a tool magazine, comprising:

providing a tool exchange arm having at least one pair of tool clamping fingers for receiving tools;

providing a locking member operable in a first state in which the at least one pair of tool clamping fingers can be opened and closed and a second state in which the at least one pair of tool clamping fingers is prevented from opening and closing;

controlling the locking member with a lock pin movable between a first position abutting against a spindle head to enable the first state and a second position away from the spindle head to enable said second state;

rotating the tool exchange arm while the locking member is in the second state and the lock pin is in the second position; and exchanging the tool between the tool spindle and the tool magazine.

* * * * *